Figure 1:
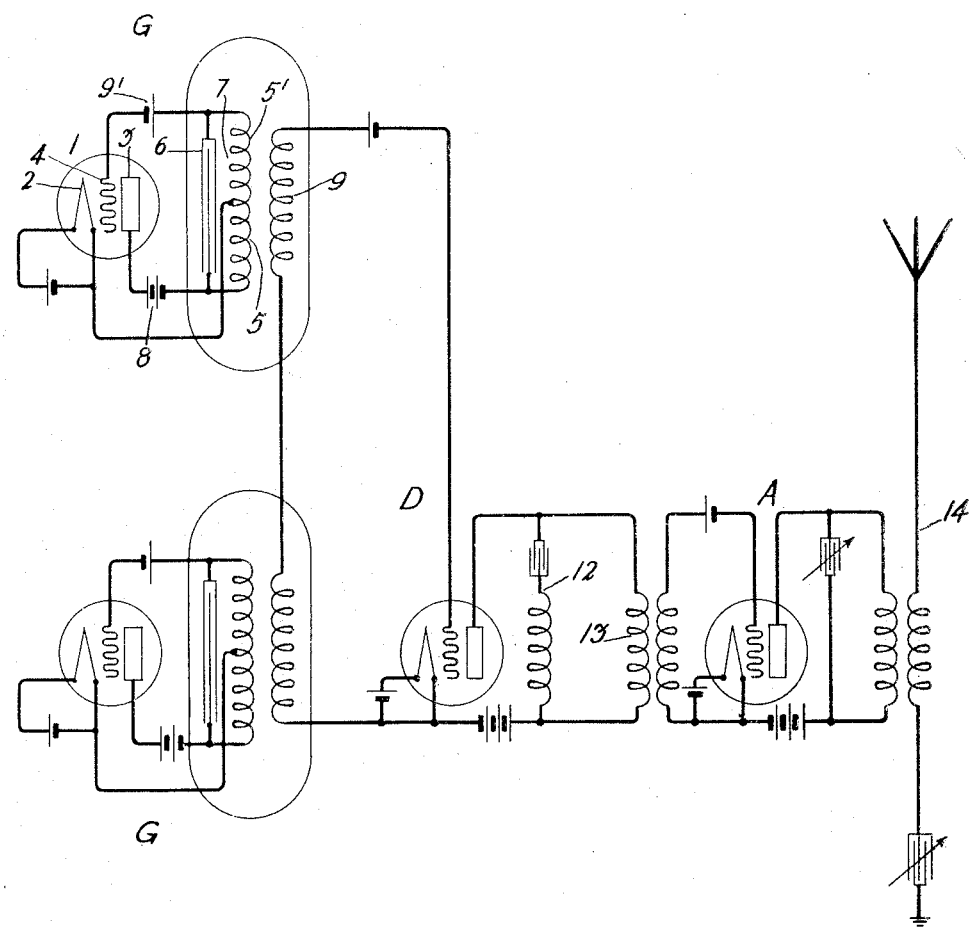

Sept. 21, 1926.

J. MILLS 1,600,421

OSCILLATION CIRCUIT

Filed Dec. 28, 1920

2 Sheets-Sheet 1

Inventor:
John Mills.

by C. A. Sprague.

Att'y.

Sept. 21, 1926.

J. MILLS

OSCILLATION CIRCUIT

Filed Dec. 28, 1920

1,600,421

2 Sheets-Sheet 2

Inventor:
John Mills
by C. A. Sprague. Atty.

Patented Sept. 21, 1926.

1,600,421

UNITED STATES PATENT OFFICE.

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

OSCILLATION CIRCUIT.

Application filed December 28, 1920. Serial No. 433,715.

This invention relates to an improved form of oscillation circuit and particularly to an oscillation circuit which includes special means for insuring a high degree of constancy of its natural frequency.

The principal object of the invention is to provide a method of and means for insuring the high degree of constancy mentioned above and more particularly to provide a means for insuring constancy of the electrical properties of the elements which determine the natural frequency of the oscillation circuit associated with or forming a part of an oscillation generator.

This invention has special reference to that type of oscillation generator characterized by the employment of an oscillation circuit the natural frequency of oscillation of which determines the frequency of the system as a whole.

Slight changes occur in the constants of an electrical circuit under variable conditions of temperature, pressure, etc. In so far as these conditions affect the frequency there is a remedy by including the parts of the oscillation circuit in a vacuum. It is not necessary here to examine into the minutiæ of the effects of the presence of these variable features, even assuming that they are capable of scientific analysis. It can, however, be stated with certainty that a large part of the effect, ascribed broadly to a variation in the capacitance of a condenser, is accountable rather by the effects of energy losses therein, which cause a variation from the theoretical 90° displacement between current and voltage vectors. In other words, dielectric displacement is attended by a conductive flow of current and the circuit may be considered as composed of a capacitance associated with a resistance either in series or parallel relation, depending on the nature of the loss. The phenomenon of dielectric absorption, also, has the characteristics of a power loss, which simulates the effect of a series or shunt resistance, this loss occurring in condensers having solid dielectrics. Since variations in temperature, pressure, humidity, etc., tend to correspondingly effect variation in the electrical resistance, it is probable that a large portion of the beneficial effect of including the oscillation circuit in a vacuum is due to the avoidance of the above noted effects by reason of the more or less complete isolation afforded thereby. Somewhat similar resistance effects are found in inductance coils and it should be further noted that the apparent inductance, i. e., the measured inductance, of a coil is a composite of a true inductance and a so-called "negative inductance" resulting from the presence of a distributed capacity associated with a shunt resistance. The variations in apparent inductance can accordingly be referred, in part, to power losses in a condenser in the manner that has been pointed out.

The principle of the invention contemplates inductance or capacitance of any type. In the case of air condensers, the use of a vacuum is attended by a decrease in specific inductive capacity of a small fraction of 1 per cent, an entirely negligible quantity. There is also a slight decrease in dielectric strength but with ordinary voltages and with a vacuum comparable with that of an incandescent lamp bulb, there is slight danger of break-down and the danger of brush discharge can be made inappreciable.

Figure 2:
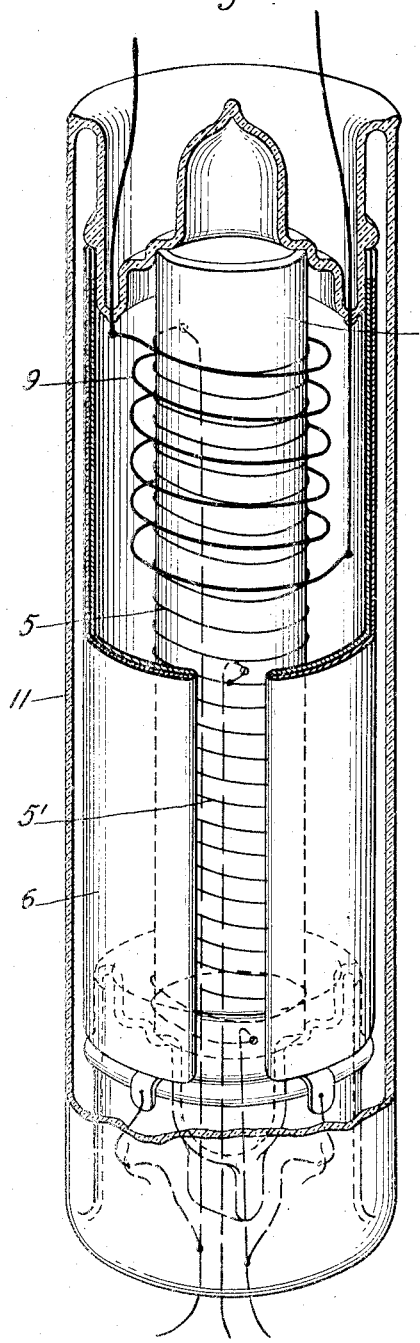
Figure 3:
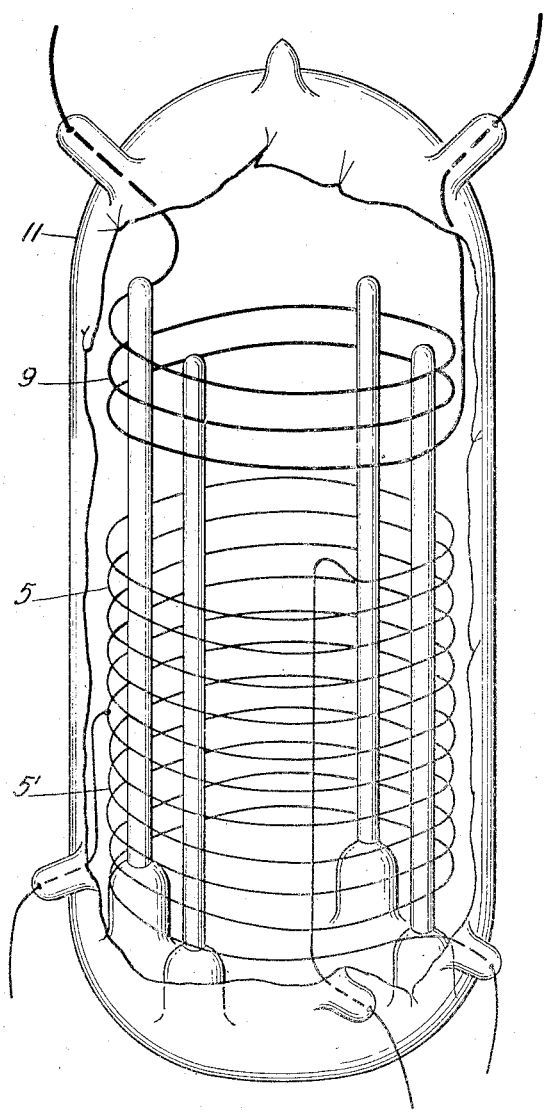

For a more detailed disclosure of the invention as embodied in a specific form, reference is made to the description which follows, taken in connection with the accompanying drawing in which Fig. 1 shows a system in which two high frequency oscillators may be combined to constitute an oscillation generator having a lower frequency; Fig. 2 shows one form of the invention; and Fig. 3 shows a modified form in which the natural capacitance existing between turns of the inductance is relied on to furnish the necessary capacitance of the oscillation circuit. There are shown in Figs. 2 and 3 the structural details of two alternative methods which may be used for mounting the reactive elements within an evacuated space, these methods being adapted from the well known practice exemplified in the vacuum tube and incandescent lamp arts. Since the oscillation circuit of a particular type of oscillator has been selected for illustration, it is well to preface the description of the specific features of the invention with a brief description of the type of oscillator here being considered and for this purpose reference is made to either of the oscillator units of Fig. 1, these units being designated by the reference character G. Many of the elements that enter into the oscillators shown in this figure will be found in Figs. 2 and 3.

Referring to the upper of the two generator units of Fig. 1, highly evacuated tube 1 contains the usual hot filament cathode 2, plate electrode 3 and impedance controlling grid 4. A two part inductance 5, 5' is connected to a condenser 6 to form a closed tuned circuit 7, one terminal of the condenser 6 being connected through a space current source 8 to plate electrode 3, while the other terminal is connected to grid 4 preferably through a source 9' which serves to keep the grid at a potential which is negative relative to that of a cathode. An intermediate point of the two-part inductance is connected to the cathode. The tuned circuit 7 constitutes the oscillation circuit of the generator and determines the natural period of the oscillator. The elements of this oscillating circuit, together with the transformer secondary 9 by means of which the energy is transmitted from the oscillator, will be found in Figs. 2 and 3 in which corresponding parts are similarly numbered.

Since, as has been pointed out, an oscillation generator involving the principles of the invention practically requires reactive elements of small physical dimensions, it would have a frequency above that ordinarily used or desirable.

Fig. 1 also shows an arrangement, including two high frequency oscillators of the invention, by means of which a low frequency current may be secured in the resulting composite system. The generators G are tuned to frequencies differing by the value of the frequency desired. The generators accordingly generate oscillations of these two frequencies respectively and impress them on the input of combining device D. This combining device has a curved characteristic so that the output current will contain components having oscillations of the frequency sum, and other oscillations of the frequency difference, of the oscillations impressed upon the input circuit. The high frequency path 12 will serve to shunt the high frequency components around winding 13 which will pass the lower difference frequency energy to amplifier A, to the output circuit of which transmitting conductor 14 is coupled.

Referring now to Fig. 2, the two part inductance 5, 5' is supported on a refractory insulating support 10 within an evacuated container 11. Condenser 6 may be of any of the well known types, that shown being illustrative only, and it is not necessary that it have a partially cylindrical form as shown. The assembly of elements according to the particular manner shown conforms with good practice in the vacuum tube art, in which the several elements of the vacuum tube have been somewhat similarly arranged, the arrangement having obvious advantages such as compactness, simplicity, and possibility of bringing out the leads with a minimum of self inductance. The transformer secondary 9 usually has sufficient strength to be self-supporting and it is here so shown. Since the natural frequency of the circuit is dependent on the reactive constants of the elements shown including the mutual inductance between the inductive elements 9 and 5, 5', the proportion of parts and the spacing therebetween is capable of indefinite variation from that shown and there may even be means for varying the circuit conditions without violation of any of the essential principles of the invention.

In the arrangement of Fig. 2 there is, of course, capacitance between the turns of the two part inductance 5, 5', which is equally as effective as the capacitance of the condenser 6 in determining the natural frequency of the circuit. In special cases this capacitance may be so great that a condenser is not necessary and in Fig. 3 there is shown an arrangement in which no condenser is used. In the particular arrangement shown the inductance 5, 5' is more concentrated than in the arrangement of Fig. 1, with correspondingly greater capacitance between its turns. This result could well be secured in the arrangement of Fig. 2 by elimination of the condenser 6 and slight changes in the proportions of the parts and the variation in the method of mounting shown in Fig. 3 is accordingly intended to show, as well, an alternative arrangement applicable equally to systems with or without a condenser. The special feature of this method of mounting is the use of the supporting rods instead of the cylinder of Fig. 1. These rods are capable of supporting both the inductances 9 and 5, 5' as shown. In case a closer coupling than that shown is desired recourse would preferably be had to an arrangement more closely resembling that of Fig. 2.

Although in Figs. 2 and 3 there has been shown the principle of the invention as embodying particular structures, it should be understood that they are illustrative of many alternative arrangements that can be used. It should further be understood that the invention is not limited to an oscillator of the particular type shown in Fig. 1. Although the invention has been described as relating to oscillation generators, in its broad aspect it is applicable to oscillation circuits, wherever found, as, for example, a tuned receiver circuit.

What is claimed is:

1. The method of keeping constant the natural frequency of an oscillation circuit which consists in maintaining a pressure which is low as compared with that of the atmosphere in the gaseous space immediately surrounding the inductance and capacitance elements thereof.

2. A reactive circuit at least a portion of which is inclosed in a space having less than atmospheric pressure, said portion containing both inductive and capacitive elements.

3. In an oscillation generator, in combination, an energy source and a resonant frequency determining circuit associated therewith, said circuit comprising an inductance coil having distributed capacity, said coil being inclosed in an evacuated space.

4. An oscillation generator, including an oscillation circuit for determining the oscillation frequency thereof, the said oscillation circuit being inclosed in a vacuum.

5. In an oscillation generator, in combination, an energy source and an oscillation circuit associated therewith and adapted to determine the frequency of said oscillation generator, said oscillation circuit being inclosed in an evacuated space.

In witness whereof, I hereunto subscribe my name this 21st day of December, A. D. 1920.

JOHN MILLS.